(12) United States Patent
Ahn et al.

(10) Patent No.: US 12,742,095 B2
(45) Date of Patent: Sep. 22, 2026

(54) OPTICAL FILM HAVING EXCELLENT IMPACT RESISTANCE AND BENDING PROPERTIES AND DISPLAY DEVICE COMPRISING SAME

(71) Applicant: KOLON INDUSTRIES, INC., Seoul (KR)

(72) Inventors: Sang Hyun Ahn, Seoul (KR); Pil Rye Yang, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 302 days.

(21) Appl. No.: 18/547,452

(22) PCT Filed: Nov. 24, 2021

(86) PCT No.: PCT/KR2021/017336

§ 371 (c)(1),
(2) Date: Aug. 22, 2023

(87) PCT Pub. No.: WO2022/203153

PCT Pub. Date: Sep. 29, 2022

(65) Prior Publication Data

US 2024/0166914 A1 May 23, 2024

(30) Foreign Application Priority Data

Mar. 26, 2021 (KR) ........................ 10-2021-0039811
Nov. 23, 2021 (KR) ........................ 10-2021-0162294

(51) Int. Cl.

*C09D 183/10* (2006.01)
*C08G 77/458* (2006.01)
*G02B 1/14* (2015.01)

(52) U.S. Cl.

CPC ......... *C09D 183/10* (2013.01); *C08G 77/458* (2013.01); *G02B 1/14* (2015.01)

(58) Field of Classification Search

CPC .. C09D 183/10; C09D 175/16; C08G 77/458; C08G 18/672; C08G 18/718;

(Continued)

(56) References Cited

U.S. PATENT DOCUMENTS 4,889,768 A * 12/1989 Yokoshima .......... C08G 18/718 525/29
2009/0025608 A1* 1/2009 Qiu ...................... C09D 175/04 106/287.11

(Continued)

FOREIGN PATENT DOCUMENTS

CN 108373844 A 8/2018
CN 109311289 A 2/2019

(Continued)

OTHER PUBLICATIONS

KR 2017-0107684 machine translation (Year: 2017).*

(Continued)

*Primary Examiner* — Blaine Copenheaver
(74) *Attorney, Agent, or Firm* — Harvest IP Law, LLP

(57) ABSTRACT

The present invention provides an optical film comprising a light-transmitting substrate and a buffer layer, and having the maximum restoration length of 40-100 mm, and a display device comprising such an optical film.

12 Claims, 6 Drawing Sheets

(58) Field of Classification Search
CPC ..... C08G 77/445; G02B 1/14; C08F 299/065; C08J 7/042; C08J 7/046
See application file for complete search history.

(56) References Cited

U.S. PATENT DOCUMENTS

| | | | | |
|---|---|---|---|---|
| 2010/0003508 A1* | 1/2010 | Arrouy | G02B 1/16 | 427/535 |
| 2023/0097067 A1* | 3/2023 | Jung | C08J 7/0427 | 428/336 |
| 2023/0100624 A1* | 3/2023 | Jung | G02B 1/04 | 359/513 |

FOREIGN PATENT DOCUMENTS

| | | | |
|---|---|---|---|
| CN | 115315469 | A | 11/2022 |
| JP | H08-201980 | A | 8/1996 |
| JP | 2016-126070 | A | 7/2016 |
| JP | 2018-134808 | A | 8/2018 |
| JP | 2019-520608 | A | 7/2019 |
| JP | 2020059797 | A | 4/2020 |
| JP | 2020176183 | A | 10/2020 |
| JP | 2020-204010 | A | 12/2020 |
| KR | 20110034959 | A | 4/2011 |
| KR | 20190017895 | A | 2/2019 |
| KR | 20200082009 | A | 7/2020 |
| TW | 201815590 | A | 5/2018 |
| TW | 201815975 | A | 5/2018 |
| WO | 2005010621 | A1 | 2/2005 |
| WO | 2018186262 | A1 | 10/2018 |
| WO | 2018230495 | A1 | 12/2018 |
| WO | 2020122229 | A1 | 6/2020 |
| WO | 2020130072 | A1 | 6/2020 |
| WO | 2021024639 | A1 | 2/2021 |
| WO | 2021194312 | A1 | 9/2021 |

OTHER PUBLICATIONS

The office action dated Jul. 30, 2024 related to the corresponding Japanese Patent application.
Office Action From Chinese Patent Office Dated Apr. 11, 2026 Issued for Corresponding Chinese Patent Applciation.

* cited by examiner 601
10 20 30 40 50 60 70

OPTICAL FILM HAVING EXCELLENT IMPACT RESISTANCE AND BENDING PROPERTIES AND DISPLAY DEVICE COMPRISING SAME

CROSS REFERENCE TO RELATED APPLICATION(S)

This application is a National Stage of International Application No. PCT/KR2021/017336 filed on Nov. 24, 2021, claiming priority based on Korean Patent Application No. 10-2021-0039811 filed on Mar. 26, 2021, and Korean Patent Application No. 10-2021-0162294 filed on Nov. 23, 2021, the disclosures of which are incorporated herein by reference in their entireties.

TECHNICAL FIELD

The present disclosure relates to an optical film having excellent impact resistance and improved restoring force after folding, and a display device including the same.

BACKGROUND ART

Recently, the use of an optical film instead of glass as a cover window of a display device has been considered with the goal of reducing the thickness and weight and increasing the flexibility of the display device. In order for the optical film to be usable as a cover window of a display device, the optical film needs to have excellent optical properties and mechanical properties.

Therefore, there is need for the development of films having excellent optical properties as well as superior mechanical properties such as insolubility, chemical resistance, heat resistance, radiation resistance and low temperature characteristics. The development of an optical film that has excellent impact properties and leaves no folding traces (marks) behind after folding is required.

A polyimide-based resin, which is a typical material for optical films, has superior insolubility, chemical resistance, heat resistance, radiation resistance, low-temperature characteristics, bendability, impact resistance, and the like, and is thus used as automobile materials, aviation materials, spacecraft materials, insulating coatings, insulating films, protective films and the like.

DISCLOSURE

Technical Problem

Therefore, the present disclosure has been made in view of the above problems, and it is one object of the present disclosure to provide an optical film that includes a novel buffer layer and thus exhibits reduced folding traces and improved impact resistance.

It is another object of the present disclosure to provide a display device including the optical film that exhibits reduced folding traces and improved impact resistance.

Technical Solution

In accordance with the present disclosure, the above and other objects can be accomplished by the provision of an optical film including a light-transmitting matrix and a buffer layer, the optical film having a maximum restoration length of 40 mm to 100 mm.

When winding a sample for measurement having a width of 50 mm and a length of 100 mm, obtained from the optical film, on a cylinder having a diameter of 10 mm in a vertical direction, fixing the sample thereon, allowing the sample to stand at 60° C./90 RH % for 24 hours, removing the sample from the cylinder, and allowing the sample to stand on a flat surface at 25° C./50 RH % for 24 hours, if the sample viewed in the vertical direction from the flat surface has the shape of a circle, one end of which contacts the other end, the maximum restoration length is defined as the diameter of the circle, and if the sample has a shape of an arc, one end of which does not contact the other end, the maximum restoration length is defined as the maximum diameter of the arc.

The buffer layer may include a urethane acrylate resin.

The buffer layer may include a urethane acrylate siloxane resin.

The urethane acrylate siloxane resin may include a urethane acrylate silane compound represented by the following Formula 1, an alkoxysilane compound represented by the following Formula 2, and a diol compound represented by the following Formula 3:

[Formula 1]

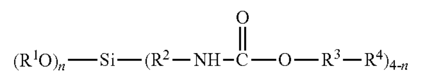

wherein $R^1$ is a functional group derived from a C1-C8 aliphatic or aromatic hydrocarbon, $R^2$ and $R^3$ are each independently a C1-C6 linear, branched, or alicyclic alkylene group, $R^4$ is an acrylate group or methacrylate group, and n is an integer of 1 to 3,

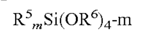

$R^5_mSi(OR^6)_{4-m}$ [Formula 2]

wherein $R^5$ and $R^6$ are each independently a functional group derived from a C1-C8 aliphatic or aromatic hydrocarbon, and m is an integer of 0 to 3,

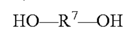

$HO—R^7—OH$ [Formula 3]

wherein $R^7$ is a functional group derived from a C1-C6 aliphatic or aromatic hydrocarbon.

$R^4$ may be an acrylate group including a hydroxyl group (—OH).

$R^4$ may be an acrylate group derived from one of 2-hydroxyethyl acrylate (2-HEA) and 4-hydroxybutyl acrylate (4-HBA).

The alkoxysilane compound may include tetraalkoxysilane.

The diol compound may include ethylene glycol.

The buffer layer may have a thickness of 10 to 150 μm.

The light-transmitting matrix may have a thickness of 10 to 100 μm.

The optical film may have an elastic modulus of 3,600 to 4,700 MPa.

The optical film may have a restoration rate (nIT) of 60 to 100% based on 12 mN.

The optical film may further include a hard coating layer.

The hard coating layer may have a thickness of 0.1 to 10 μm.

In accordance with another aspect of the present disclosure, there is provided a display device including a display panel and the optical film disposed on the display panel.

Advantageous Effects

An embodiment of the present disclosure provides an optical film that includes the buffer layer, thereby leaving no folding traces after folding, rapidly removing the folding traces even if folding traces remain, and exhibiting excellent impact resistance.

In addition, an embodiment of the present disclosure provides an optical film having no folding traces thereon.

Another embodiment of the present disclosure may provide a display device including an optical film having reduced folding traces.

DESCRIPTION OF DRAWINGS

The above and other objects, features and other advantages of the present disclosure will be more clearly understood from the following detailed description taken in conjunction with the accompanying drawings, in which.

BEST MODE

Figure 1:
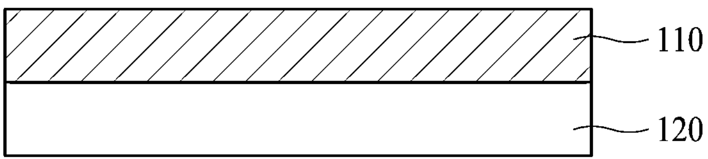
FIG. 1 is a cross-sectional view illustrating an optical film according to an embodiment of the present disclosure.

Hereinafter, embodiments of the present disclosure will be described in detail with reference to the accompanying drawings. However, the following embodiments are provided illustratively merely for clear understanding of the present disclosure, and do not limit the scope of the present disclosure.

The shapes, sizes, ratios, angles, and numbers disclosed in the drawings for describing embodiments of the present disclosure are merely examples, and the present disclosure is not limited to the illustrated details. Like reference numerals refer to like elements throughout the present specification. In the following description, when a detailed description of relevant known functions or configurations is determined to unnecessarily obscure important points of the present disclosure, the detailed description will be omitted.

In the case in which the term such as "comprise", "have", or "include" is used in the present specification, another part may also be present, unless "only" is used. Terms in a singular form may include the plural meanings unless noted to the contrary. Also, in construing an element, the element is to be construed as including an error range even if there is no explicit description thereof.

In describing a positional relationship, for example, when the positional relationship is described as "on", "above", "below", or "next", the case of no contact therebetween may be included, unless "just" or "directly" is used.

Spatially relative terms such as "below", "beneath", "lower", "above", and "upper" may be used herein to describe the relationship of a device or an element to another device or another element as shown in the figures. It will be understood that spatially relative terms are intended to encompass different orientations of a device during the use or operation of the device, in addition to the orientation depicted in the figures. For example, if a device in one of the figures is turned upside down, elements described as "below" or "beneath" other elements would then be positioned "above" the other elements. The exemplary term "below" or "beneath" can, therefore, encompass the meanings of both "below" and "above". In the same manner, the exemplary term "above" or "upper" can encompass the meanings of both "above" and "below".

In describing temporal relationships, for example, when the temporal order is described using "after", "subsequent", "next", or "before", the case of a non-continuous relationship may be included, unless "just" or "directly" is used.

It will be understood that, although the terms "first", "second", etc. may be used herein to describe various elements, these elements should not be limited by these terms. These terms are only used to distinguish one element from another. Therefore, a first element could be termed a second element within a technical idea of the present disclosure.

It should be understood that the term "at least one" includes all combinations related with any one item. For example, "at least one among a first element, a second element, and a third element" may include all combinations of two or more elements selected from among the first, second, and third elements, as well as each of the first, second, and third elements.

Features of various embodiments of the present disclosure may be partially or completely coupled to or combined with each other, and may be variously interoperated with each other and driven technically, as will be easily understood by those skilled in the art. The embodiments of the present disclosure may be carried out independently from each other, or may be carried out together in an interrelated manner.

Figure 2:
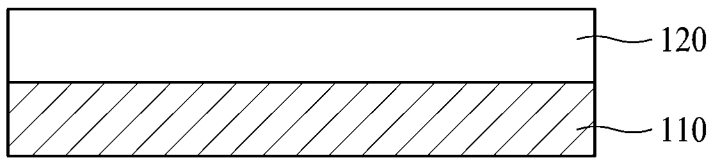
FIG. 2 is a cross-sectional view illustrating an optical film according to another embodiment of the present disclosure.

FIG. 1 is a sectional view illustrating an optical film according to an embodiment of the present disclosure, and FIG. 2 is a sectional view illustrating an optical film according to another embodiment of the present disclosure.

One embodiment of the present disclosure provides an optical film. The optical film according to the embodiment of the present disclosure includes a light-transmitting matrix 110 and a buffer layer 120. As shown in FIG. 1, in the optical film of the present disclosure, the buffer layer 120 may be formed on the lower surface of the light-transmitting matrix 110. However, the present disclosure is not limited thereto, and, as shown in FIG. 2, in the optical film of the present disclosure, the buffer layer 120 may be formed on the upper surface of the light-transmitting matrix 110. Alternatively, although not shown in the drawings, the buffer layer 120 may be disposed on both the upper and lower surfaces of the light-transmitting matrix 110. The buffer layer 120 may be disposed at any position as needed, and another layer may be formed between the light-transmitting matrix 110 and the buffer layer 120. However, when the buffer layer 120 is formed on the upper surface of the light-transmitting matrix 110, the hardness of the buffer layer 120 is low, and the durability and scratch resistance of the optical film may decrease. Thus, it is preferable that the buffer layer 120 be formed on the lower surface of the light-transmitting matrix 110.

The light-transmitting matrix 110 according to an embodiment of the present disclosure may be any type of material capable of transmitting light. For example, the light-transmitting matrix 110 may include glass or a polymer resin. In particular, the polymer resin is suitable for use as a cover window of a flexible display device due to the excellent flexural properties and impact resistance thereof.

The polymer resin may be included in a film in various shapes and forms, such as a solid powder form, a form dissolved in a solution, a matrix form solidified after being dissolved in a solution, etc. Any resin containing the same repeating unit as the resin of the present disclosure may be considered the same as the polymer resin of the present disclosure, regardless of the shape and form thereof. In general, the polymer resin in the film may be present as a solidified matrix obtained by applying a polymer resin solution, followed by drying.

The polymer resin according to an embodiment of the present disclosure may be any light-transmitting resin. For example, the polymer resin may include at least one selected from cycloolefin derivatives, cellulose polymers, ethylene vinyl acetate copolymers, polyester polymers, polystyrene polymers, polyamide polymers, polyamideimide polymers, polyetherimide polymers, polyacrylic polymers, polyimide polymers, polyether sulfone polymers, polysulfone polymers, polyethylene polymers, polypropylene polymers, polymethylpentene polymers, polyvinyl chloride polymers, polyvinylidene chloride polymers, polyvinyl alcohol polymers, polyvinyl acetal polymers, polyether ketone polymers, polyether ether ketone polymers, polymethyl methacrylate polymers, polyethylene terephthalate polymers, polybutylene terephthalate polymers, polyethylene naphthalate polymers, polycarbonate polymers, polyurethane polymers, and epoxy polymers. Preferably, the polymer resin according to an embodiment of the present disclosure may include at least one of polyimide polymers, polyamide polymers, and polyamide-imide polymers.

According to an embodiment of the present disclosure, the light-transmitting matrix 110 may be any one of polyimide matrixes, polyamide matrixes, and polyamide-imide matrixes. However, the embodiments of the present disclosure are not limited thereto, and any matrix may be used as the light-transmitting matrix 110, as long as it is light-transmissive.

According to an embodiment of the present disclosure, the optical film may have a maximum restoration length of 40 mm to 100 mm.

When winding a sample for measurement having a width of 50 mm and a length of 100 mm, obtained from the optical film, on a cylinder having a diameter of 10 mm in a vertical direction, fixing the sample thereon, allowing the sample to stand at 60° C./90 RH % for 24 hours, removing the sample from the cylinder, and allowing the sample to stand on a flat surface at 25° C./50 RH % for 24 hours, if the sample viewed in the vertical direction from the flat surface has the shape of a circle, one end of which contacts the other end, the maximum restoration length is defined as the diameter of the circle, and if the sample has the shape of an arc, one end of which does not contact the other end, the maximum restoration length is defined as the maximum diameter of the arc.

Hereinafter, the maximum restoration length of the present disclosure will be described in more detail with reference to the drawings.

FIG. 3A to 3E illustrate a method of measuring the maximum restoration length.

Figure 3A:
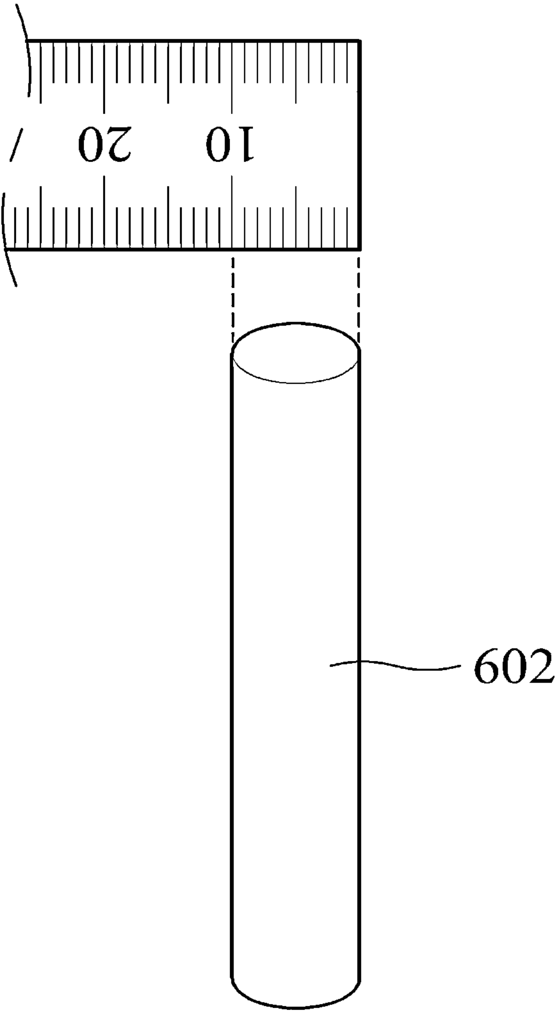
FIGS. 3A to 3E illustrate a method of measuring a maximum restoration length.
Figure 3B:
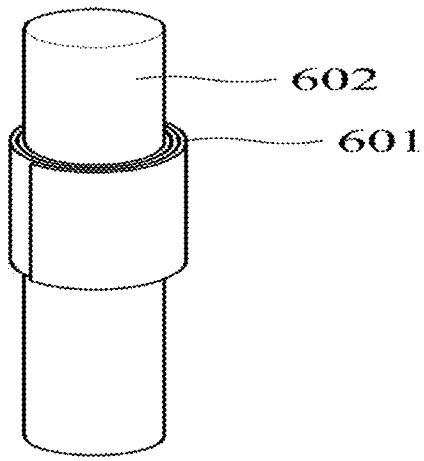
Figure 3C:
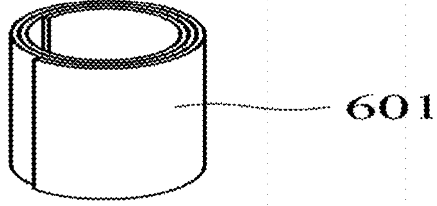
Figures 3D, 3E:
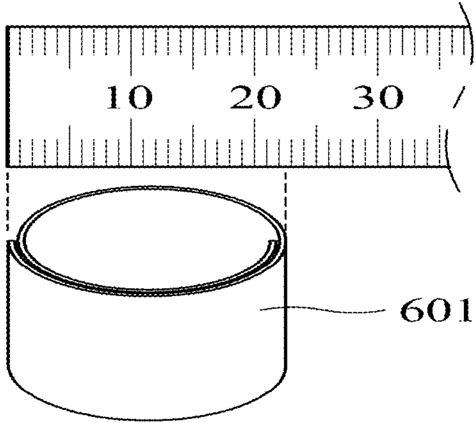

FIG. 3A shows a cylinder 602. FIG. 3B shows that the sample 601 of the optical film for measurement is wound and fixed on the cylinder 602. FIG. 3C shows that the sample 601 for measurement is removed from the cylinder 602 and allowed to stand on a flat surface. FIG. 3D and FIG. 3E show that the maximum diameter of the sample 601 for measurement is measured.

As shown in FIG. 3A to 3E, after the sample 601 is fixed on the cylinder 602 at 60° C./90RH % for 24 hours, removed therefrom, and allowed to stand on a flat surface, the sample 601 for measurement tends to return to its original state. However, because the elasticity and flexibility of the optical film are insufficient, the sample 601 for measurement fails to be restored and is wound in the shape of a circle, and the sample 601 for measurement of the optical film having excellent elasticity and flexibility takes the shape of a broad arc. Here, "the shape of a circle" means that one end of the measurement sample 601 contacts the other end thereof at a predetermined portion, and "the shape of an arc" means that one end and the other end do not contact each other. When the sample 601 for measurement takes a circular shape, the maximum diameter of the circle is taken as the "maximum restoration length", and when the sample 601 for measurement takes an arc shape, the maximum distance along a straight line between two different points on the corresponding arc is taken as the "maximum restoration length".

According to an embodiment of the present disclosure, when the maximum restoration length of the optical film is less than 40 mm, the restoration rate of the optical film after folding is low, and it is difficult to use the optical film as a cover window of a flexible display device. In addition, folding traces are left and thus visibility is lowered.

According to an embodiment of the present disclosure, the optical film includes the buffer layer 120 in order for the optical film to have a maximum restoration length of 40 mm to 100 mm. The buffer layer 120 may be formed on at least one of the two surfaces of the light-transmitting matrix 110. The buffer layer 120 may be formed in the upper-surface direction of the light-transmitting matrix 110, may be formed in the lower-surface direction thereof, or may be formed in both the upper-surface and lower-surface directions. In order to improve durability and scratch resistance, it is preferable that the buffer layer 120 be formed in the lower-surface direction. The buffer layer 120 may be in direct contact with the light-transmitting matrix 110, or another layer may be disposed between the buffer layer 120 and the light-transmitting matrix 110.

According to an embodiment of the present disclosure, the buffer layer 120 may include a urethane acrylate resin.

According to an embodiment of the present disclosure, preferably, the buffer layer 120 may include a urethane acrylate siloxane resin.

In an embodiment of the present disclosure, the urethane acrylate siloxane resin may include a urethane acrylate silane compound represented by the following Formula 1, an alkoxysilane compound represented by the following Formula 2, and a diol compound represented by the following Formula 3:

[Formula 1]

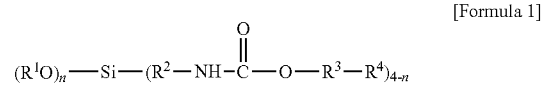

wherein $R^1$ is a functional group derived from a C1-C8 aliphatic or aromatic hydrocarbon, $R^2$ and $R^3$ are each independently a C1-C6 linear, branched or alicyclic alkylene group, $R^4$ is an acrylate group or methacrylate group, and n is an integer of 1 to 3,

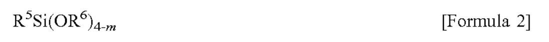

$R^5Si(OR^6)_{4-m}$ [Formula 2]

wherein $R^5$ and $R^6$ are each independently a functional group derived from a C1-C8 aliphatic or aromatic hydrocarbon, and m is an integer of 0 to 3,

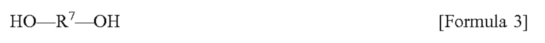

$$HO—R^7—OH \quad \text{[Formula 3]}$$

wherein $R^7$ is a functional group derived from a C1-C6 aliphatic or aromatic hydrocarbon.

Since the buffer layer 120 according to the present disclosure includes the urethane acrylate siloxane resin prepared from a composition containing the compounds represented by Formulas 1 to 3, the optical film including the buffer layer 120 can be imparted with the maximum restoration length of 40 mm to 100 mm.

More specifically, since the urethane acrylate siloxane resin according to the present disclosure includes the urethane acrylate silane compound represented by Formula 1, the buffer layer 120 can serve to offset tensile or compressive forces applied to the inner substrate disposed in the lower part of the optical film when the display device is folded, thereby reducing folding traces generated during folding.

Since the urethane acrylate siloxane resin according to the present disclosure includes the alkoxysilane compound represented by Formula 2, the buffer layer 120 can be imparted with appropriate hardness and thus deformation of the optical film due to external force can be minimized.

Since the urethane acrylate siloxane resin according to the present disclosure includes the diol compound represented by Formula 3, the flexibility of the buffer layer 120 can be maximized, elasticity can be imparted to the buffer layer 120, and the smoothness of the coating surface can be improved when the light-transmitting matrix 110 is coated with the buffer layer 120. Therefore, when the optical film is folded, the buffer layer 120 can be prevented from peeling off from the light-transmitting matrix 110 and thus the folding reliability of the optical film can be improved.

According to an embodiment of the present disclosure, the composition for forming the urethane acrylate siloxane resin contains the urethane acrylate silane compound represented by Formula 1 and the alkoxysilane compound represented by Formula 2 at a molar ratio of 9:1 to 5:5. Preferably, the composition for forming the urethane acrylate siloxane resin may contain the urethane acrylate silane compound represented by Formula 1 and the alkoxysilane compound represented by Formula 2 at a molar ratio of 8:2 to 6:4.

When the molar ratio of the urethane acrylate silane compound represented by Formula 1 to the alkoxysilane compound represented by Formula 2 is higher than 9:1, in other words, when the molar amount of the urethane acrylate silane compound represented by Formula 1 is higher than the amount represented by the molar ratio of 9:1, for example, when the molar ratio is 10:0, that is, when the composition contains only the urethane acrylate silane compound represented by Formula 1, there are problems in that a buffer layer 120 that is not hard but soft is formed due to the greatly reduced hardness of the buffer layer 120 and restoration subsequent to an external impact may be deteriorated. In addition, when the composition contains only the urethane acrylate silane compound represented by Formula 1, without the alkoxysilane compound represented by Formula 2, there is a problem in that the polymerization reaction is remarkably inhibited.

On the other hand, when the molar ratio of the urethane acrylate silane compound represented by Formula 1 to the alkoxysilane compound represented by Formula 2 is greater than 5:5, that is, when the molar amount of the alkoxysilane compound represented by Formula 2 is greater than the amount represented by the molar ratio of 5:5, there are problems in that the flexibility of the buffer layer 120 decreases, the buffer layer 120 may be broken when used as a coating layer of a film due to the excessive hardness thereof, and the restoring force of the buffer layer 120 is lowered due to the low elasticity thereof.

Therefore, in order to impart appropriate hardness and elasticity to the buffer layer 120, the urethane acrylate silane compound represented by Formula 1 and the alkoxysilane compound represented by Formula 2 should be contained in a molar ratio of 9:1 to 5:5.

According to an embodiment of the present disclosure, the composition for forming the urethane acrylate siloxane resin may contain "the sum of the urethane acrylate silane compound represented by Formula 1 and the alkoxysilane compound represented by Formula 2" and the "diol compound represented by Formula 3" at a molar ratio of 8:2 to 3:7.

When the molar ratio of "the sum of the urethane acrylate silane compound represented by Formula 1 and the alkoxysilane compound represented by Formula 2" to the "diol compound represented by Formula 3" is greater than 8:2, there are problems in that the flexibility and elasticity of the buffer layer 120 may be lowered, and the buffer layer 120 may break or crack during folding. In addition, the smoothness of the coating surface of the buffer layer 120 may be reduced, and thus the buffer layer 120 may peel off from the transmitting matrix 110.

On the other hand, when the molar ratio of "the sum of the urethane acrylate silane compound represented by Formula 1 and the alkoxy silane compound represented by Formula 2" to the "diol compound represented by Formula 3" is less than 5:5, there are problems in that a soft buffer layer 120 having insufficient hardness is formed and restoration subsequent to an external impact is reduced.

In an embodiment of the present disclosure, $R^4$ may be an acrylate group including a hydroxyl group (—H). Specifically, for example, $R^4$ is an acrylate group derived from either 2-hydroxyethyl acrylate (2-HEA) or 4-hydroxybutyl acrylate (4-HBA).

According to an embodiment of the present disclosure, the urethane acrylate silane compound represented by Formula 1 may include at least one silane compound selected from a silane compound represented by the following Formula 4 and a silane compound represented by the following Formula 5:

[Formula 4]

[Formula 5]

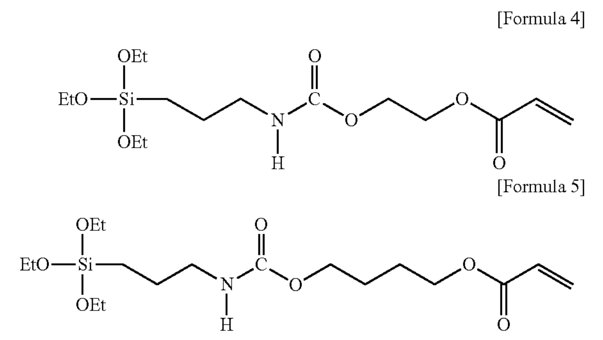

According to an embodiment of the present disclosure, the alkoxysilane compound represented by Formula 2 may include tetraalkoxysilane ($Si(OR^6)_4$). Since the composition for forming the urethane acrylate siloxane resin includes tetraalkoxysilane, the buffer layer 120 can be imparted with appropriate hardness and thus deformation of the optical film due to external force can be minimized. On the other hand, when trialkoxysilane or dialkoxysilane is contained therein, the improvement in the hardness of the buffer layer 120 is insufficient, so the extent of deformation of the optical film upon application of external force may increase.

According to an embodiment of the present disclosure, the diol compound represented by Formula 3 may include ethylene glycol. Since the composition for forming the urethane acrylate siloxane resin contains ethylene glycol, the buffer layer 120 can be imparted with increased flexibility and excellent elasticity. Accordingly, the maximum restoration length of the optical film can be increased.

According to one embodiment of the present disclosure, the light-transmitting matrix 110 may have a thickness of 10 to 100 μm. When the thickness of the light-transmitting matrix 110 is less than 10 μm, the light-transmitting matrix 110 is unsuitable for use as a cover window due to the lowered durability and heat resistance thereof. On the other hand, when the thickness of the light-transmitting matrix 110 is greater than 100 μm, the thickness of the optical film increases excessively, thus increasing the minimum radius of curvature during folding, deteriorating the bending characteristics of the optical film, and decreasing visibility due to the decrease in light transmittance.

According to an embodiment of the present disclosure, the buffer layer 120 may have a thickness of 10 to 150 μm. When the thickness of the buffer layer 120 is less than 10 μm, the effects of reducing the folding traces and improving the impact resistance of the buffer layer 120 are insufficient. On the other hand, when the thickness of the buffer layer 120 is greater than 150 μm, the thickness of the optical film excessively increases, the minimum radius of curvature increases during folding, and the bending characteristics of the optical film are deteriorated.

According to an embodiment of the present disclosure, the optical film of the present disclosure may have an elastic modulus of 3,600 to 4,700 MPa.

The elastic modulus of the optical film may be measured using nanoindentation (Fischer, model HM2000) under conditions of 12 mN/12 s/Creep 5 s/24° C. and 40 RH %.

The optical film according to an embodiment of the present disclosure may have a restoration rate (nIT) of 60 to 100% based on 12 mN. The restoration rate (12 mN) of the optical film may be measured using nanoindentation (Fischer, model HM2000) under conditions of 12 mN/12 s/Creep 5 s/24° C. and 40 RH %. The measurement of the restoration rate (12 mN) is performed by orienting the buffer layer 120 downwards, orienting the light-transmitting matrix 110 upwards, and measuring the physical properties of the matrix as the upper layer. The optical film of the present disclosure includes the buffer layer 120 and thus is imparted with a restoration rate (nIT; 12 mN) of 60% or more.

The optical film according to an embodiment of the present disclosure may have a composite hardness of 220 to 310 $N/mm^2$.

The composite hardness of the optical film may be measured using nanoindentation (Fischer, model HM2000) under conditions of 12 mN/12 s/Creep 5 s/24° C. and 40 RH %. The measurement of the composite hardness is performed by orienting the buffer layer 120 downwards, orienting the light-transmitting matrix 110 upwards, and measuring the physical properties of the matrix as the upper layer.

The optical film according to an embodiment of the present disclosure may have a crack point of R3.5 or less.

The crack point of the optical film can be measured by detecting the point where cracks occur while reducing the radius of curvature using a JIRBT-620-2 radius bending tester from JUNIL Tech. The R value at the point where cracks occur is defined as the crack point.

Figure 4:
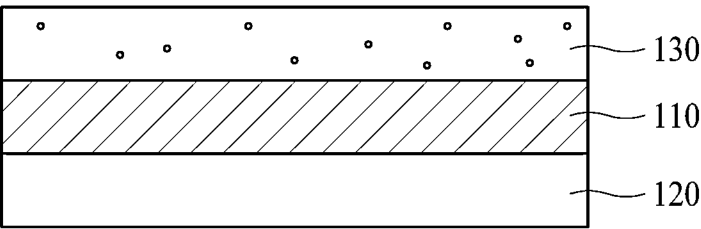
FIG. 4 is a cross-sectional view illustrating an optical film according to another embodiment of the present disclosure, further comprising a hard coating layer.
Figure 5:
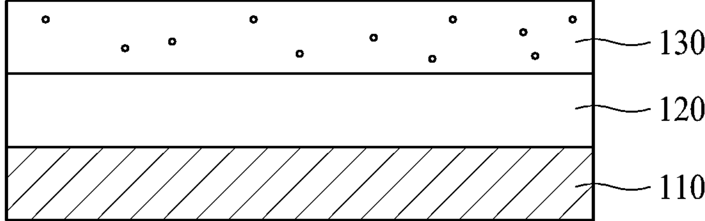
FIG. 5 is a cross-sectional view illustrating an optical film according to another embodiment of the present disclosure, further comprising a hard coating layer.
Figure 6:
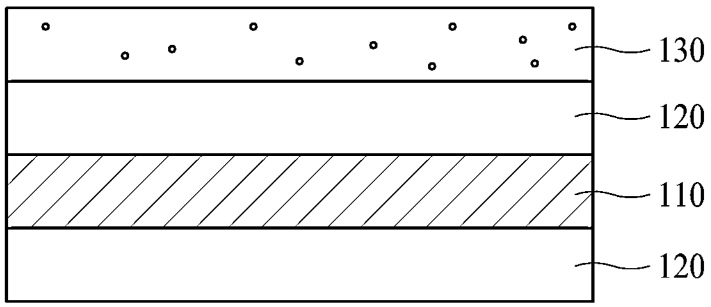
FIG. 6 is a cross-sectional view illustrating an optical film according to another embodiment of the present disclosure, further comprising a hard coating layer.

Hereinafter, other embodiments of the present disclosure will be described in detail with reference to FIGS. 4 to 6. FIGS. 4 to 5 are cross-sectional views illustrating an optical film according to other embodiments of the present disclosure, further including a hard coating layer.

According to another embodiment of the present disclosure, the optical film may further include the hard coating layer 130. As shown in FIG. 4, in the optical film of the present disclosure, the hard coating layer 130 may be formed on the upper surface of the buffer layer 120, but the present disclosure is not limited thereto. As shown in FIG. 5, the buffer layer 120 may be formed on the lower surface of the light-transmitting matrix 110, and the hard coating layer 130 may be formed on the upper surface of the light-transmitting matrix 110. In addition, as shown in FIG. 6, in the optical film according to the present disclosure, the buffer layer 120 may be formed on both the upper and lower surfaces of the light-transmitting matrix 110, and the hard coating layer 130 may be formed on the upper surface of the buffer layer 120. The buffer layer 120 and the hard coating layer 130 may be disposed at any number at any position as needed, and another layer may be also formed between the light-transmitting matrix 110 and the buffer layer 120, or between the light-transmitting matrix 110 and the hard coating layer 130, or between the buffer layer 120 and the hard coating layer 130.

Since the optical film of the present disclosure further includes the hard coating layer 130, mechanical properties such as durability and scratch resistance of the optical film can be improved.

According to another embodiment of the present disclosure, the hard coating layer 130 may include at least one of an epoxy-based resin, a siloxane-based resin, and an acrylate-based resin.

According to another embodiment of the present disclosure, the hard coating layer 130 may have a thickness of 0.1 to 10 μm. When the thickness of the hard coating layer 130 is less than 0.1 μm, the improvement in durability and scratch resistance due to the hard coating layer 130 may be insufficient. On the other hand, when the thickness of the hard coating layer 130 is greater than 10 μm, it is difficult to use the optical film as a cover window of the flexible display device due to the increased drag force of the optical film.

According to an embodiment of the present disclosure, the optical film is light-transmissive. In addition, the optical film is flexible. For example, the optical film may be bendable, foldable and rollable. The optical film may have excellent mechanical and optical properties.

According to an embodiment of the present disclosure, the optical film may have a thickness sufficient for the optical film to protect the display panel. For example, the optical film may have a thickness of 20 to 300 μm.

The optical film according to an embodiment of the present disclosure may have a yellow index of 5.0 or less based on a thickness of 100 μm. In addition, the optical film according to an embodiment of the present disclosure may have a yellow index of 4.0 or less, or a yellow index of 2.0 or less, based on a thickness of 100 μm.

The yellow index may be measured using a CM-3700 spectrophotometer produced from KONICA MINOLTA based on transmittance under conditions of D65/2°.

The optical film according to an embodiment of the present disclosure may have light transmittance of 88.00% or more in a visible light region measured with a UV spectrophotometer, based on a thickness of 100 μm. In addition, the optical film according to an embodiment of the present disclosure may have light transmittance of 90% or more or light transmittance of 91% or more based on a thickness of 50 μm.

The light transmittance may be measured in a wavelength range of 360 to 740 nm using a spectrophotometer in accordance with the JIS K 7361 standard. An example of the spectrophotometer used herein may be an HM-150 hazemeter produced by Murakami Color Research Laboratory.

The optical film according to an embodiment of the present disclosure may have a haze of 2.0 or less based on a thickness of 100 μm. In addition, the optical film according to an embodiment of the present disclosure may have a haze of 1.0 or less, or a haze of 0.5 or less, based on a thickness of 100 μm.

The haze may be measured using a spectrophotometer in accordance with the JIS K 7136 standard. An example of the spectrophotometer used herein may be an HM-150 haze meter produced by Murakami Color Research Laboratory.

Hereinafter, a display device using an optical film according to an embodiment of the present disclosure will be described with reference to FIGS. 7 and 8.

Figure 7:
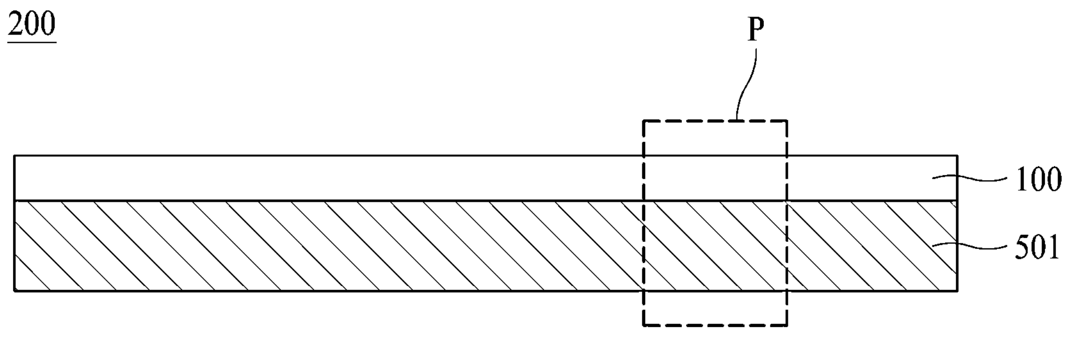
FIG. 7 is a cross-sectional view of a part of a display device according to still another embodiment of the present disclosure.
Figure 8:
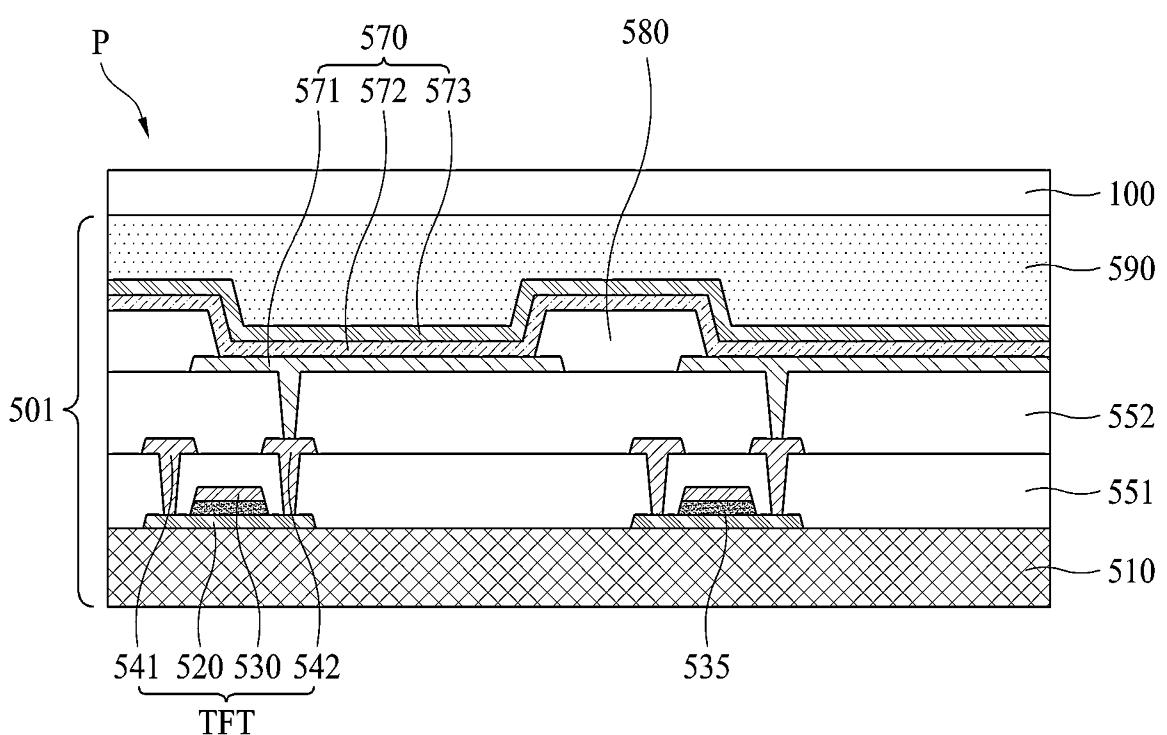
FIG. 8 is an enlarged cross-sectional view illustrating part "P" of FIG. 7.

FIG. 7 is a cross-sectional view illustrating a part of a display device 200 according to another embodiment, and FIG. 8 is an enlarged cross-sectional view of part "P" in FIG. 7.

Referring to FIG. 7, the display device 200 according to another embodiment of the present disclosure includes a display panel 501 and an optical film 100 on the display panel 501.

Referring to FIGS. 7 and 8, the display panel 501 includes a substrate 510, a thin film transistor TFT on the substrate 510, and an organic light-emitting device 570 connected to the thin film transistor TFT. The organic light-emitting device 570 includes a first electrode 571, an organic light-emitting layer 572 on the first electrode 571, and a second electrode 573 on the organic light-emitting layer 572. The display device 200 shown in FIGS. 5 and 6 is an organic light-emitting display device.

The substrate 510 may be formed of glass or plastic. Specifically, the substrate 510 may be formed of plastic such as a polymer resin or an optical film. Although not shown, a buffer layer may be disposed on the substrate 510.

The thin film transistor TFT is disposed on the substrate 510. The thin film transistor TFT includes a semiconductor layer 520, a gate electrode 530 that is insulated from the semiconductor layer 520 and overlaps at least a part of the semiconductor layer 520, a source electrode 541 connected to the semiconductor layer 520, and a drain electrode 542 that is spaced apart from the source electrode 541 and is connected to the semiconductor layer 520.

Referring to FIG. 8, a gate insulating layer 535 is disposed between the gate electrode 530 and the semiconductor layer 520. An interlayer insulating layer 551 may be disposed on the gate electrode 530, and a source electrode 541 and a drain electrode 542 may be disposed on the interlayer insulating layer 551.

A planarization layer 552 is disposed on the thin film transistor TFT to planarize the top of the thin film transistor TFT.

The first electrode 571 is disposed on the planarization layer 552. The first electrode 571 is connected to the thin film transistor TFT through a contact hole provided in the planarization layer 552.

A bank layer 580 is disposed on the planarization layer 552 in a part of the first electrode 571 to define pixel areas or light-emitting areas. For example, the bank layer 580 is disposed in the form of a matrix at the boundaries between a plurality of pixels to define the respective pixel regions.

The organic light-emitting layer 572 is disposed on the first electrode 571. The organic light-emitting layer 572 may also be disposed on the bank layer 580. The organic light-emitting layer 572 may include one light-emitting layer or two light-emitting layers stacked in a vertical direction. Light having any one color among red, green, and blue may be emitted from the organic light-emitting layer 572, and white light may be emitted therefrom.

The second electrode 573 is disposed on the organic light-emitting layer 572.

The first electrode 571, the organic light-emitting layer 572, and the second electrode 573 may be stacked to constitute the organic light-emitting device 570.

Although not shown, when the organic light-emitting layer 572 emits white light, each pixel may include a color filter for filtering the white light emitted from the organic light-emitting layer 572 based on a particular wavelength. The color filter is formed in the light path.

A thin film encapsulation layer 590 may be disposed on the second electrode 573. The thin film encapsulation layer 590 may include at least one organic layer and at least one inorganic layer, and the at least one organic layer and the at least one inorganic layer may be alternately disposed.

The optical film 100 according to the present disclosure is disposed on the display panel 501 having the stack structure described above.

Hereinafter, the present disclosure will be described in more detail with reference to exemplary Preparation Examples, Examples, and Comparative Examples. However, these Preparation Examples, Examples, and Comparative Examples should not be construed as limiting the scope of the present disclosure.

Preparation Example 1: Preparation of Polymer Resin Composition for Light-Transmitting Matrix 80.06 g (250 mmol) of TFDB (diamine-based compound) was dissolved in dimethylacetamide (DMAc, solvent) in a 4-neck double-jacketed reactor. 19.86 g (68 mmol) of BPDA (dianhydride-based compound) was added thereto and stirred while maintaining the temperature of the reactor was maintained at 25° C. for 2 hours. Upon completion of the reaction, 13.33 g (30 mmol) of 6FDA (dianhydride-based compound) was added thereto, followed by stirring at 25° C. for 1 hour. Then, 29.945 g (154 mmol) of TPC was added to the reaction solution, followed by stirring at 15° C. for 1 hour.

After the polymerization reaction was completed, pyridine (Py, 16.97 g) as an imidization catalyst and acetic anhydride (AA, 21.97 g) as a dehydrating agent were added to the reaction solution, the temperature was increased to 80° C., and the reaction solution was stirred for 1 hour. The reaction solution was cooled to room temperature and poured into methanol (3,000 ml) to cause precipitation. The precipitate was filtered to obtain a polymer resin as a white solid. The obtained polymer resin was in the form of a solid powder. The polymer resin prepared in Preparation Example 1 was a polyamide-imide polymer resin.

The polymer resin obtained as the solid powder was dissolved in dimethylacetamide (DMAc) at a concentration of 12.7 wt % to prepare a polymer resin composition.

Preparation Example 2: Preparation of Urethane Acrylate Siloxane Resin Composition for Buffer Layer Preparation Example 2-1

1) 495 g (2.00 mol) of a compound represented by the following Formula 6 (3-(triethoxysilyl) propyl isocyanate, Shinetsu, KBE-9007), 317 g (2.20 mol) of 4-hydroxybutyl acrylate (OSAKA Organic Chemical Industry, 4-HBA), and 11 g of triethylamine were put into a 500 mL glass reactor and allowed to react with stirring for 24 hours at room temperature using a mechanical stirrer.

[Formula 6]

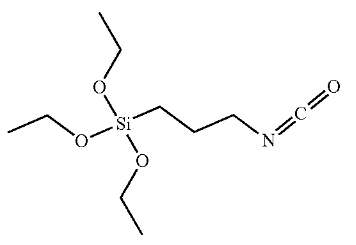

2) 353 g (0.90 mmol) of the reaction product obtained in step 1), 21 g (0.10 mol) of tetraethoxysilane (EVONIK, Dynasylan A), 28 g of $H_2O$, and 0.1 g of NaOH were put into a 500 mL glass reactor and allowed to react with stirring at 80° C. for 8 hours using a mechanical stirrer to obtain a urethane acrylate siloxane resin composition.

The weight average molecular weight of the urethane acrylate siloxane resin measured using GPC was 2,512, and the PDI thereof was 1.8.

Preparation Example 2-2

1) 495 g (2.00 mol) of a compound represented by the following Formula 6 (3-(triethoxysilyl) propyl isocyanate, Shinetsu, KBE-9007), 317 g (2.20 mol) of 4-hydroxybutyl acrylate (OSAKA Organic Chemical Industry, 4-HBA), and 11 g of triethylamine were put into a 500 mL glass reactor and allowed to react with stirring for 24 hours at room temperature using a mechanical stirrer.

2) 314 g (0.80 mmol) of the reaction product obtained in step 1), 42 g (0.20 mol) of tetraethoxysilane (EVONIK, Dynasylan A), 29 g of $H_2O$, and 0.1 g of NaOH were put into a 500 mL glass reactor and allowed to react with stirring at 80° C. for 8 hours using a mechanical stirrer to obtain a urethane acrylate siloxane resin composition.

The weight average molecular weight of the urethane acrylate siloxane resin measured using GPC was 2,785, and the PDI thereof was 2.1.

Preparation Example 2-3

1) 495 g (2.00 mol) of a compound represented by the following Formula 6 (3-(triethoxysilyl) propyl isocyanate, Shinetsu, KBE-9007), 317 g (2.20 mol) of 4-hydroxybutyl acrylate (OSAKA Organic Chemical Industry, 4-HBA), and 11 g of triethylamine were put into a 500 mL glass reactor and allowed to react with stirring for 24 hours at room temperature using a mechanical stirrer.

2) 274 g (0.70 mmol) of the reaction product obtained in step 1), 62 g (0.30 mol) of tetraethoxysilane (EVONIK, Dynasylan A), 30 g of $H_2O$, and 0.1 g of NaOH were put into a 500 mL glass reactor and allowed to react with stirring at 80° C. for 8 hours using a mechanical stirrer to obtain a urethane acrylate siloxane resin composition.

The weight average molecular weight of the urethane acrylate siloxane resin, measured using GPC, was 2,965, and the PDI thereof was 2.2.

Preparation Example 2-4

1) 495 g (2.00 mol) of a compound represented by the following Formula 6 (3-(triethoxysilyl) propyl isocyanate, Shinetsu, KBE-9007), 317 g (2.20 mol) of 4-hydroxybutyl acrylate (OSAKA Organic Chemical Industry, 4-HBA), and 11 g of triethylamine were put into a 500 mL glass reactor and allowed to react with stirring for 24 hours at room temperature using a mechanical stirrer.

2) 235 g (0.60 mmol) of the reaction product obtained in step 1), 83 g (0.40 mol) of tetraethoxysilane (EVONIK, Dynasylan A), 31 g of $H_2O$, and 0.1 g of NaOH were put into a 500 mL glass reactor and allowed to react with stirring at 80° C. for 8 hours using a mechanical stirrer to obtain a urethane acrylate siloxane resin composition.

The weight average molecular weight of the urethane acrylate siloxane resin measured using GPC was 2,754, and the PDI thereof was 1.9.

Preparation Example 2-5

1) 495 g (2.00 mol) of a compound represented by the following Formula 6 (3-(triethoxysilyl) propyl isocyanate, Shinetsu, KBE-9007), 317 g (2.20 mol) of 4-hydroxybutyl acrylate (OSAKA Organic Chemical Industry, 4-HBA) and 11 g of triethylamine were put into a 500 mL glass reactor and allowed to react with stirring for 24 hours at room temperature using a mechanical stirrer.

2) 196 g (0.50 mmol) of the reaction product obtained in step 1), 104 g (0.50 mol) of tetraethoxysilane (EVONIK, Dynasylan A), 32 g of $H_2O$, and 0.1 g of NaOH were put into a 500 mL glass reactor and allowed to react with stirring at 80° C. for 8 hours using a mechanical stirrer to obtain a urethane acrylate siloxane resin composition.

The weight average molecular weight of the urethane acrylate siloxane resin, measured using GPC, was 2,498, and the PDI thereof was 1.8.

Preparation Example 2-6

1) 495 g (2.00 mol) of a compound represented by the following Formula 6 (3-(triethoxysilyl) propyl isocyanate, Shinetsu, KBE-9007), 255 g (2.20 mol) of 2-hydroxyethyl acrylate (OSAKA Organic Chemical Industry, 2-HEA) and 11 g of triethylamine were put into a 500 mL glass reactor and allowed to react with stirring for 24 hours at room temperature using a mechanical stirrer.

2) 255 g (0.70 mmol) of the reaction product obtained in step 1), 62 g (0.30 mol) of tetraethoxysilane (EVONIK, Dynasylan A), 30 g of $H_2O$, and 0.1 g of NaOH were put into a 500 mL glass reactor and allowed to react with stirring at 80° C. for 8 hours using a mechanical stirrer to obtain a urethane acrylate siloxane resin composition.

The weight average molecular weight of the urethane acrylate siloxane resin, measured using GPC, was 2,836, and the PDI thereof was 2.0.

Preparation Example 2-7

1) 495 g (2.00 mol) of a compound represented by the following Formula 6 (3-(triethoxysilyl) propyl isocyanate, Shinetsu, KBE-9007), 317 g (2.20 mol) of 4-hydroxybutyl acrylate (OSAKA Organic Chemical Industry, 4-HBA), and 11 g of triethylamine were put into a 500 mL glass reactor and allowed to react with stirring for 24 hours at room temperature using a mechanical stirrer.

2) 274 g (0.70 mmol) of the reaction product obtained in step 1), 62 g (0.30 mol) of tetraethoxysilane (EVONIK, Dynasylan A), 24 g (1.33 mol) of $H_2O$, 20 g (0.33 mol) of ethylene glycol (Sigma-Aldrich), and 0.1 g of NaOH were put into a 500 mL glass reactor and allowed to react with stirring at 80° C. for 8 hours using a mechanical stirrer to obtain a urethane acrylate siloxane resin composition.

The weight average molecular weight of the urethane acrylate siloxane resin, measured using GPC, was 2,415, and the PDI thereof was 1.6.

Preparation Example 2-8

1) 495 g (2.00 mol) of a compound represented by the following Formula 6 (3-(triethoxysilyl) propyl isocyanate, Shinetsu, KBE-9007), 317 g (2.20 mol) of 4-hydroxybutyl acrylate (OSAKA Organic Chemical Industry, 4-HBA), and 11 g of triethylamine were put into a 500 mL glass reactor and allowed to react with stirring for 24 hours at room temperature using a mechanical stirrer.

2) 274 g (0.70 mmol) of the reaction product obtained in step 1), 62 g (0.30 mol) of tetraethoxysilane (EVONIK, Dynasylan A), 21 g (1.17 mol) of $H_2O$, 31 g (0.50 mol) of ethylene glycol (Sigma-Aldrich), and 0.1 g of NaOH were put into a 500 mL glass reactor and allowed to react with stirring at 80° C. for 8 hours using a mechanical stirrer to obtain a urethane acrylate siloxane resin composition.

The weight average molecular weight of the urethane acrylate siloxane resin, measured using GPC, was 2,232, and the PDI thereof was 1.4.

Preparation Example 2-9

1) 495 g (2.00 mol) of a compound represented by the following Formula 6 (3-(triethoxysilyl) propyl isocyanate, Shinetsu, KBE-9007), 317 g (2.20 mol) of 4-hydroxybutyl acrylate (OSAKA Organic Chemical Industry, 4-HBA), and 11 g of triethylamine were put into a 500 mL glass reactor and allowed to react with stirring for 24 hours at room temperature using a mechanical stirrer.

2) 274 g (0.70 mmol) of the reaction product obtained in step 1), 62 g (0.30 mol) of tetraethoxysilane (EVONIK, Dynasylan A), 15 g (0.83 mol) of $H_2O$, 51 g (0.83 mol) of ethylene glycol (Sigma-Aldrich), and 0.1 g of NaOH were put into a 500 mL glass reactor and allowed to react with stirring at 80° C. for 8 hours using a mechanical stirrer to obtain a urethane acrylate siloxane resin composition.

The weight average molecular weight of the urethane acrylate siloxane resin, measured using GPC, was 2,485, and the PDI thereof was 1.6.

Preparation Example 2-10

1) 495 g (2.00 mol) of a compound represented by the following Formula 6 (3-(triethoxysilyl) propyl isocyanate, Shinetsu, KBE-9007), 317 g (2.20 mol) of 4-hydroxybutyl acrylate (OSAKA Organic Chemical Industry, 4-HBA), and 11 g of triethylamine were put into a 500 mL glass reactor and allowed to react with stirring for 24 hours at room temperature using a mechanical stirrer.

2) 274 g (0.70 mmol) of the reaction product obtained in step 1), 62 g (0.30 mol) of tetraethoxysilane (EVONIK, Dynasylan A), 9 g (0.5 mol) of $H_2O$, 72 g (1.16 mol) of ethylene glycol (Sigma-Aldrich), and 0.1 g of NaOH were put into a 500 mL glass reactor and allowed to react with stirring at 80° C. for 8 hours using a mechanical stirrer to obtain a urethane acrylate siloxane resin composition.

The weight average molecular weight of the urethane acrylate siloxane resin, measured using GPC, was 2,132, and the PDI thereof was 1.3.

Preparation Example 2-11

1) 223 g (0.09 mol) of 3-methacryloxypropyl triethoxysilane (Shinetsu, KBM-503), 21 g (0.10 mol) of tetraethoxysilane (EVONIK, Dynasylan A), 28 g of $H_2O$, and 0.1 g of NaOH were put into a 500 mL glass reactor and allowed to react with stirring at 80° C. for 8 hours using a mechanical stirrer to obtain a siloxane resin composition.

The weight average molecular weight of the siloxane resin, measured using GPC, was 6,736, and the PDI thereof was 2.6.

Preparation Example 2-12

1) 124 g (0.50 mol) of 3-methacryloxypropyl triethoxysilane (Shinetsu, KBM-503), 104 g (0.50 mol) of tetraethoxysilane (EVONIK, Dynasylan A), 32 g of $H_2O$, and 0.1 g of NaOH were put into a 500 mL glass reactor and allowed to react with stirring at 80° C. for 8 hours using a mechanical stirrer to obtain a siloxane resin composition.

The weight average molecular weight of the siloxane resin, measured using GPC, was 6,532, and the PDI thereof was 2.8.

Preparation Example 2-13

1) 99 g (0.40 mol) of 3-methacryloxypropyl triethoxysilane (Shinetsu, KBM-503), 125 g (0.60 mol) of tetraethoxysilane (EVONIK, Dynasylan A), 32 g of $H_2O$, and 0.1 g of NaOH were put into a 500 mL glass reactor and allowed to react with stirring at 80° C. for 8 hours using a mechanical stirrer to obtain a siloxane resin composition.

The weight average molecular weight of the siloxane resin, measured using GPC, was 6,281, and the PDI thereof was 2.9.

Preparation Example 3: Preparation of Resin Composition for Hard Coating Layer>

1) 223 g (0.90 mol) of 3-methacryloxypropyl triethoxysilane (Shinetsu, KBM-503), 21 g (0.10 mol) of tetraethoxysilane (EVONIK, Dynasylan A), 28 g of $H_2O$, and 0.1 g of NaOH were put into a 500 mL glass reactor and allowed to react with stirring at 80° C. for 8 hours using a mechanical stirrer to obtain a urethane acrylate siloxane resin composition.

The weight average molecular weight of the urethane acrylate siloxane resin measured using GPC was 6,736, and the PDI thereof was 2.6.

Example 1

1) The polymer resin composition solution prepared in Preparation Example 1 was cast. A casting substrate was used for casting. There is no particular limitation as to the type of the casting substrate. The casting substrate may be a glass substrate, a stainless steel (SUS) substrate, a Teflon substrate, or the like. According to an embodiment of the present disclosure, the casting substrate may be, for example, a glass substrate.

Specifically, the polymer resin solution of Preparation Example 1 was applied to a glass substrate, cast, and dried with hot air at 80° C. for 20 minutes and at 120° C. for 20 minutes to produce a light-transmitting matrix, and then the produced light-transmitting matrix was peeled off from the glass substrate and fixed to the frame with a pin.

The frame to which the light-transmitting matrix was fixed was placed in an oven and dried with hot air at a constant temperature of 290° C. for 30 minutes. As a result, a light-transmitting matrix having a thickness of 50 μm was obtained.

2) 10 g of the urethane acrylate siloxane resin composition of Preparation Example 2-1, 10 g of 2-butanone (MEK), and 0.1 g of 1-benzoylcyclohexanol (IRGACURE 184 from BASF) were mixed, and the resulting mixture was applied to the light-transmitting matrix produced in 1) using a Mayer bar or an applicator to form a coating film.

The light-transmitting matrix coated with the urethane acrylate siloxane resin composition was dried in an oven at 100° C. for 10 minutes, and exposed to UV (150 $mW/cm^2$, 2 $J/cm^2$) to produce an optical film coated with a buffer layer. The thickness of the buffer layer was 20 μm. In this case, the light-transmitting matrix was the upper surface of the optical film, and the buffer layer was the lower surface of the optical film.

Examples 2 to 14

The optical films of Examples 2 to 14 were produced in the same manner as in Example 1, except that the type of the urethane acrylate siloxane resin composition and the thickness of the buffer layer were changed.

The details of types of the urethane acrylate siloxane resin compositions and thicknesses of the buffer layers with respect to Examples 2 to 14 are shown in Table 1 below.

Example 15

1) An optical film was produced in the same manner as in Example 8.

2) The resin composition for the hard coating layer of Preparation Example 3 was applied to the upper surface of the optical film (the upper surface of the light-transmitting matrix) produced in Example 8 using a Mayer bar or an applicator to form a coating film.

The optical film coated with the resin composition for the hard coating layer was dried in an oven at 100° C. for 10 minutes and exposed to UV (100 $mW/cm^2$, 1 $J/cm^2$) to produce an optical film coated with the hard coating layer. The thickness of the hard coating layer was 5 μm.

The details of the urethane acrylate siloxane resin composition of Example 15 are shown in Table 1 below.

Comparative Example 1

1) The polymer resin composition solution prepared in Preparation Example 1 was cast. A casting substrate was used for casting. There is no particular limitation as to the type of the casting substrate. The casting substrate may be a glass substrate, a stainless steel (SUS) substrate, a Teflon substrate, or the like. According to an embodiment of the present disclosure, the casting substrate may be, for example, a glass substrate.

Specifically, the polymer resin solution of Preparation Example 1 was applied to a glass substrate, cast, and dried with hot air at 80° C. for 20 minutes and at 120° C. for 20 minutes to produce a light-transmitting matrix, and then the produced light-transmitting matrix was peeled off from the glass substrate and fixed to the frame with a pin.

The frame to which the light-transmitting matrix was fixed was placed in an oven and dried with hot air at a constant temperature of 290° C. for 30 minutes. As a result, a light-transmitting matrix having a thickness of 50 μm was obtained.

2) 10 g of the siloxane resin composition of Preparation Example 2-11, 10 g of 2-butanone (MEK), and 0.1 g of 1-benzoylcyclohexanol (IRGACURE 184 from BASF) were mixed, and the resulting mixture was applied to the light-transmitting matrix produced in 1) using a Mayer bar or an applicator to form a coating film.

The light-transmitting matrix coated with the siloxane resin composition was dried in an oven at 100° C. for 10 minutes and exposed to UV (150 $mW/cm^2$, 2 $J/cm^2$) to produce an optical film coated with a buffer layer. The thickness of the buffer layer was 20 μm. In this case, the light-transmitting matrix was the upper surface of the optical film and the buffer layer was the lower surface of the optical film.

Comparative Example 2

The optical film of Comparative Example 2 was produced in the same manner as in Comparative Example 1, except that the siloxane resin composition was changed.

The details of the type of the siloxane resin composition and thickness of the buffer layer with respect to Comparative Example 2 are shown in Table 1 below.

Comparative Example 3

The optical film of Comparative Example 3 was produced in the same manner as in Comparative Example 1, except that the siloxane resin composition was changed.

The details of the type of the siloxane resin composition and thickness of the buffer layer with respect to Comparative Example 3 are shown in Table 1 below.

TABLE 1

| Item | Type of siloxane resin | Thickness of light-transmitting matrix (μm) | Thickness of buffer layer (μm) | Molar ratio of urethane acrylate silane compound represented by Formula 1 to alkoxysilane compound represented by Formula 2 | Molar ratio of "$H_2O$" to "diol compound represented by Formula 3" |
|---|---|---|---|---|---|
| Example 1 | Preparation Example 2-1 | 50 | 20 | 9:1 | — |
| Example 2 | Preparation Example 2-2 | 50 | 20 | 8:2 | — |
| Example 3 | Preparation Example 2-3 | 50 | 20 | 7:3 | — |
| Example 4 | Preparation Example 2-4 | 50 | 20 | 6:4 | — |
| Example 5 | Preparation Example 2-5 | 50 | 20 | 5:5 | — |
| Example 6 | Preparation Example 2-6 | 50 | 20 | 7:3 | — |
| Example 7 | Preparation Example 2-7 | 50 | 20 | 7:3 | 8:2 |
| Example 8 | Preparation Example 2-8 | 50 | 20 | 7:3 | 7:3 |
| Example 9 | Preparation Example 2-9 | 50 | 20 | 7:3 | 5:5 |
| Example 10 | Preparation Example 2-10 | 50 | 20 | 7:3 | 3:7 |
| Example 11 | Preparation Example 2-8 | 50 | 10 | 7:3 | 7:3 |
| Example 12 | Preparation Example 2-8 | 50 | 50 | 7:3 | 7:3 |
| Example 13 | Preparation Example 2-8 | 50 | 100 | 7:3 | 7:3 |
| Example 14 | Preparation Example 2-8 | 50 | 150 | 7:3 | 7:3 |
| Example 15 | Preparation Example 2-8 | 50 | 20 | 7:3 | 7:3 |
| Comparative Example 1 | Preparation Example 2-11 | 50 | 20 | — | — |
| Comparative Example 2 | Preparation Example 2-12 | 50 | 20 | — | — |
| Comparative Example 3 | Preparation Example 2-13 | 50 | 20 | — | — |

Example of Measurement

The following measurements were performed on the polymer resins and films prepared in Examples 1 to 15 and Comparative Examples 1 to 3.

1) Maximum restoration length (mm): when winding a sample for measurement having a width of 50 mm and a length of 100 mm, obtained from the optical film, on a cylinder having a diameter of 10 mm in a vertical direction, fixing the sample thereon, allowing the sample to stand at 60° C./90 RH % for 24 hours, removing the sample from the cylinder, and allowing the sample to stand on a flat surface at 25° C./50 RH % for 24 hours, if the sample viewed in the vertical direction from the flat surface had the shape of a circle, one end of which contacts the other end, the maximum restoration length was defined as the diameter of the circle, and if the sample had the shape of an arc, one end of which does not contact the other end, the maximum restoration length was defined as the maximum diameter of the arc.

2) Elastic modulus (EIT, MPa): the elastic modulus was measured using nanoindentation (Fischer, model HM2000) under conditions of 12 mN/12 s/Creep 5 s/24° C. and 40 RH %.

3) 12 mN restoration rate (nIT, %): the restoration rate (12 mN) of the optical film was measured using nanoindentation (Fischer, model HM2000) under conditions of 12 mN/12 s/Creep 5 s/24° C. and 40 RH %.

4) Light transmittance (%): Light transmittance (%) was measured in a wavelength range of 360 to 740 nm using a spectrophotometer in accordance with the JIS K 7361 standard. The spectrophotometer used herein was an HM-150 haze meter produced by Murakami Color Research Laboratory.

5) Haze: haze was measured using a spectrophotometer in accordance with the JIS K 7136 standard. The spectrophotometer used herein was an HM-150 haze meter produced by Murakami Color Research Laboratory.

6) Composite hardness ($N/mm^2$): composite hardness was measured using nanoindentation (Fischer, model HM2000) under conditions of 12 mN/12 s/Creep 5 s/24° C. and 40 RH %. The measurement of the composite hardness was performed by orienting the buffer layer 120 downwards, orienting the light-transmitting matrix 110 upwards, and measuring the physical properties of the matrix as the upper layer.

7) Crack point (R): the crack point was measured by detecting the point at which cracks occur while reducing the radius of curvature using a JIRBT-620-2 radius bending tester from JUNIL Tech. The R value at the point where cracks occur was defined as the crack point.

The results of measurement are shown in Table 2 below:

TABLE 2

| Item | Maximum restoration length (mm) | EIT (MPa) | 12 mN restoration rate (nIT, %) | Light transmittance (%) | Haze | Composite hardness ($N/mm^2$) | Crack point (R) |
|---|---|---|---|---|---|---|---|
| Example 1 | 40 | 4188 | 77 | 90 | 0.3 | 252 | 1.0 |
| Example 2 | 40 | 4250 | 80 | 90 | 0.3 | 263 | 1.0 |
| Example 3 | 50 | 4375 | 82 | 90 | 0.3 | 271 | 1.0 |
| Example 4 | 50 | 4495 | 81 | 90 | 0.3 | 284 | 2.0 |
| Example 5 | 40 | 4632 | 80 | 90 | 0.3 | 301 | 3.5 |
| Example 6 | 50 | 4420 | 80 | 90 | 0.3 | 272 | 1.5 |
| Example 7 | 70 | 4195 | 80 | 90 | 0.3 | 253 | <1.0 |
| Example 8 | 70 | 4203 | 81 | 90 | 0.3 | 246 | <1.0 |
| Example 9 | 40 | 4105 | 65 | 90 | 0.3 | 231 | <1.0 |
| Example 10 | 40 | 4080 | 60 | 90 | 0.3 | 223 | <1.0 |
| Example 11 | 60 | 4095 | 62 | 90 | 0.3 | 232 | <1.0 |
| Example 12 | 70 | 4321 | 88 | 90 | 0.3 | 262 | 1.5 |
| Example 13 | 70 | 4585 | 96 | 90 | 0.3 | 278 | 2.2 |
| Example 14 | 70 | 4572 | 95 | 90 | 0.3 | 276 | 2.8 |
| Example 15 | 80 | 3640 | 90 | 92 | 0.3 | 234 | 1.0 |
| Comparative Example 1 | 30 | 4052 | 62 | 90 | 0.3 | 220 | 4.0 |
| Comparative Example 2 | 30 | 4058 | 59 | 90 | 0.3 | 225 | 5.5 |
| Comparative Example 3 | 35 | 4062 | 55 | 90 | 0.3 | 230 | 6.0 |

As can be seen from the measurement results shown in Table 2, the optical films of Examples 1 to 15 of the present disclosure had a maximum restoration length of 40 to 100 mm, and had a crack point of 3.5 R or less and an excellent restoration rate after folding.

However, the optical films of Comparative Examples 1 to 3 had a maximum restoration length of less than 40 mm, a crack point of 3.5 R or more, and a low restoration rate after folding.

Explanation of Reference Numerals

100: Optical film
110: Light-transmitting matrix
120: Buffer layer
130: Hard coating layer
200: Display device
501: Display panel

The invention claimed is:

1. An optical film comprising:

a light-transmitting matrix; and a buffer layer, wherein the light-transmitting matrix includes a polymer resin, wherein the buffer layer comprises a urethane acrylate siloxane resin, wherein the urethane acrylate siloxane resin comprises:

a urethane acrylate silane compound represented by the following Formula 1;

an alkoxysilane compound represented by the following Formula 2; and a diol compound represented by the following Formula 3:

[Formula 1]

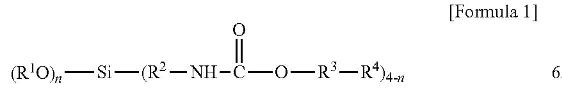

wherein $R^1$ is a functional group derived from a C1-C8 aliphatic or aromatic hydrocarbon, $R^2$ and $R^3$ are each independently a C1-C6 linear, branched, or alicyclic alkylene group, $R^4$ is an acrylate group or methacrylate group, and n is an integer of 1 to 3,

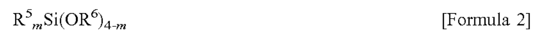

$R^5_mSi(OR^6)_{4-m}$ [Formula 2]

wherein $R^5$ and $R^6$ are each independently a functional group derived from a C1-C8 aliphatic or aromatic hydrocarbon, and m is an integer of 0 to 3,

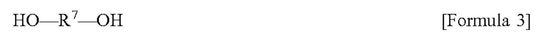

$HO—R^7—OH$ [Formula 3]

wherein $R^7$ is a functional group derived from a C1-C6 aliphatic or aromatic hydrocarbon, wherein the urethane acrylate siloxane resin comprises the urethane acrylate silane compound represented by Formula 1 and the alkoxysilane compound represented by Formula 2 at a molar ratio of 9:1 to 5:5, wherein the optical film having a maximum restoration length of 40 mm to 100 mm, wherein when winding a sample for measurement having a width of 50 mm and a length of 100 mm, obtained from the optical film, on a cylinder having a diameter of 10 mm in a vertical direction, fixing the sample thereon, allowing the sample to stand at 60° C./90 RH % for 24 hours, removing the sample from the cylinder, and allowing the sample to stand on a flat surface at 25° C./50 RH % for 24 hours, if the sample viewed in the vertical direction from the flat surface has a shape of a circle, one end of which contacts the other end, the maximum restoration length is defined as a maximum diameter of the circle, and if the sample has a shape of an arc, one end of which does not contact the other end, the maximum restoration length is defined as a maximum diameter of the arc.

2. The optical film according to claim 1, wherein $R^4$ is an acrylate group including a hydroxyl group (—OH).

3. The optical film according to claim 1, wherein $R^4$ is an acrylate group derived from one of 2-hydroxyethyl acrylate (2-HEA) or 4-hydroxybutyl acrylate (4-HBA).

4. The optical film according to claim 1, wherein the alkoxysilane compound comprises tetraalkoxysilane.

5. The optical film according to claim 1, wherein the diol compound comprises ethylene glycol.

6. The optical film according to claim 1, wherein the buffer layer has a thickness of 10 to 150 μm.

7. The optical film according to claim 1, wherein the light-transmitting matrix has a thickness of 10 to 100 μm.

8. The optical film according to claim 1, wherein the optical film has an elastic modulus of 3,600 to 4,700 MPa.

9. The optical film according to claim 1, wherein the optical film has a restoration rate (nIT) of 60 to 100% based on 12 mN.

10. The optical film according to claim 1, further comprising a hard coating layer.

11. The optical film according to claim 10, wherein the hard coating layer has a thickness of 0.1 to 10 μm.

12. A display device comprising:

a display panel; and the optical film according to claim 1 disposed on the display panel.

* * * * *